United States Patent
Magnusson et al.

(10) Patent No.: US 9,148,011 B2
(45) Date of Patent: Sep. 29, 2015

(54) APPARATUS ARRANGED TO BREAK AN ELECTRICAL CURRENT

(75) Inventors: Jesper Magnusson, Åkersberga (SE); Lars Liljestrand, Västerås (SE); Robert Saers, Västerås (SE)

(73) Assignee: ABB TECHNOLOGY LTD, Zurich (CH)

( * ) Notice: Subject to any disclaimer, the term of this patent is extended or adjusted under 35 U.S.C. 154(b) by 0 days.

(21) Appl. No.: 14/422,817

(22) PCT Filed: Aug. 27, 2012

(86) PCT No.: PCT/EP2012/066612
§ 371 (c)(1),
(2), (4) Date: Feb. 20, 2015

(87) PCT Pub. No.: WO2014/032692
PCT Pub. Date: Mar. 6, 2014

(65) Prior Publication Data
US 2015/0222111 A1    Aug. 6, 2015

(51) Int. Cl.
*H02H 3/20* (2006.01)
*H01H 9/54* (2006.01)

(52) U.S. Cl.
CPC *H02H 3/20* (2013.01); *H01H 9/541* (2013.01)

(58) Field of Classification Search
CPC .................................. H02H 3/20; H01H 9/541
USPC ......................................................... 361/91.5
See application file for complete search history.

(56) References Cited

U.S. PATENT DOCUMENTS

| 4,110,806 | A | * | 8/1978 | Murano et al. ..................... 361/4 |
| 4,459,629 | A | * | 7/1984 | Titus .................................. 361/3 |
| 4,723,187 | A | | 2/1988 | Howell |
| 5,699,218 | A | | 12/1997 | Kadah |
| 6,075,684 | A | * | 6/2000 | Duba et al. ......................... 361/4 |
| 6,535,366 | B1 | | 3/2003 | Fröhlich et al. |
| 7,643,256 | B2 | | 1/2010 | Wright et al. |
| 2007/0014055 | A1 | | 1/2007 | Ness |
| 2012/0032762 | A1* | | 2/2012 | Lescale ........................... 335/11 |

FOREIGN PATENT DOCUMENTS

| FR | 1304411 | 9/1962 |
| WO | WO 2011/033254 A2 | 3/2011 |
| WO | WO 2011/034140 A1 | 3/2011 |
| WO | WO 2011/044928 A1 | 4/2011 |
| WO | WO 2012/100831 A1 | 8/2012 |

* cited by examiner

*Primary Examiner* — Scott Bauer
(74) *Attorney, Agent, or Firm* — Birch, Stewart, Kolasch & Birch, LLP

(57) ABSTRACT

An apparatus is arranged to break an electrical current. The apparatus includes: a mechanical switch leg including a first winding of a mutual inductor and a mechanical switch connected in series; a semiconductor switch leg including a second winding of the mutual inductor and a semiconductor switch connected in series; and an overvoltage protection circuit. The mechanical switch leg and the semiconductor switch leg are connected in parallel and a self inductance of the second winding is lower than a self inductance of the first winding. A corresponding DC circuit breaker and AC current limiter are also presented.

20 Claims, 5 Drawing Sheets

APPARATUS ARRANGED TO BREAK AN ELECTRICAL CURRENT

TECHNICAL FIELD

The invention relates to an apparatus arranged to break an electrical current.

BACKGROUND

For solid state and hybrid breakers, the current changes path one or more times during the operation of the breaker. This change of current path is referred to as current commutation. In the solid state breaker, the current normally flows in a path with an IGBT (Insulated Gate Bipolar Transistor) or other similar component. Upon IGBT turn-off, the current cannot be interrupted instantly due to the inductance of the circuit. The current is thus commutated to a path parallel with the IGBT. The parallel path can contain a snubber circuit including e.g. a Metal Oxide Varistor, MOV. When the current has reached zero in the IGBT, the current commutation is completed.

Similar commutations are made in hybrid breakers, where the current flows in a mechanical switch branch during normal closed operation. When the mechanical switch opens, the current is first commutated to a parallel solid state breaker having an IGBT and another parallel path with a snubber. A hybrid breaker of this type will thus have two current commutations; first the current commutates from the mechanical switch to the IGBT, and then from the IGBT to the snubber.

WO 2011/044928 discloses a hybrid circuit breaker known in the art. The circuit breaker comprises a main current path with a mechanical switch element, a commutation path parallel to the main path and comprising a controllable semiconductor switch element, as well as a dissipative circuit arranged in parallel with the main path and the commutation path and provided with a suitable dissipative element, such as a varistor or the like.

When faults occur, the current through the mechanical switch element increases, making it increasingly difficult to commutate the current from the mechanical switch element. Hence, in the prior art it is increasingly difficult to open the mechanical switch element, before the current through the mechanical switch element has grown too large. For hybrid breakers, this requires a fast current commutation away from the mechanical breaker path.

SUMMARY

It is an object to provide an apparatus for breaking electrical currents which can break currents with reduced dependency on time.

According to a first aspect, it is provided an apparatus arranged to break an electrical current. The apparatus comprises: a mechanical switch leg comprising a first winding of a mutual inductor and a mechanical switch connected in series; a semiconductor switch leg comprising a second winding of the mutual inductor and a semiconductor switch connected in series; and an overvoltage protection circuit. The mechanical switch leg and the semiconductor switch leg are connected in parallel and a self inductance of the second winding is lower than a self inductance of the first winding.

Due to the difference in the self inductances of the first and second windings, the effect of commutating current from the mechanical switch leg the semiconductor switch leg is easier the greater the rate of change of the current is. In other words, the fault is utilised to reduce the current in the mechanical switch leg to allow the mechanical switch to open, such that the faster the current rises, the easier it becomes to commutate the current from the mechanical switch to the semiconductor switch. In some solutions of the prior art, large reactors have been provided to reduce the rate at which the current is increased. However, with the presented solution, such costly reactors are not needed.

The apparatus according may further comprise a third leg comprising the overvoltage protection circuit and the third leg may be connected in parallel to the mechanical switch leg and the semiconductor switch leg.

The third leg further may comprise a third winding of the mutual inductor, the third winding being connected in series with the overvoltage protection circuit.

The overvoltage protection circuit may be connected in parallel with the semiconductor switch.

The overvoltage protection circuit may be a snubber.

The snubber may be a varistor, an RC snubber, an RCD snubber or a capacitor.

The semiconductor switch may be a transistor.

The semiconductor switch may be a thyristor.

The thyristor may be a gate turn-off thyristor.

The transistor may be a transistor selected from the group consisting of an insulated gate bipolar transistor, a metal oxide semiconductor field effect transistor, and a field effect transistor.

The mutual inductor may comprise an air core or a metal core.

According to a second aspect, it is provided a direct current (DC) circuit breaker comprising the apparatus according to the first aspect.

According to a third aspect, it is provided an alternating current (AC) current limiter comprising the apparatus according to the first aspect.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
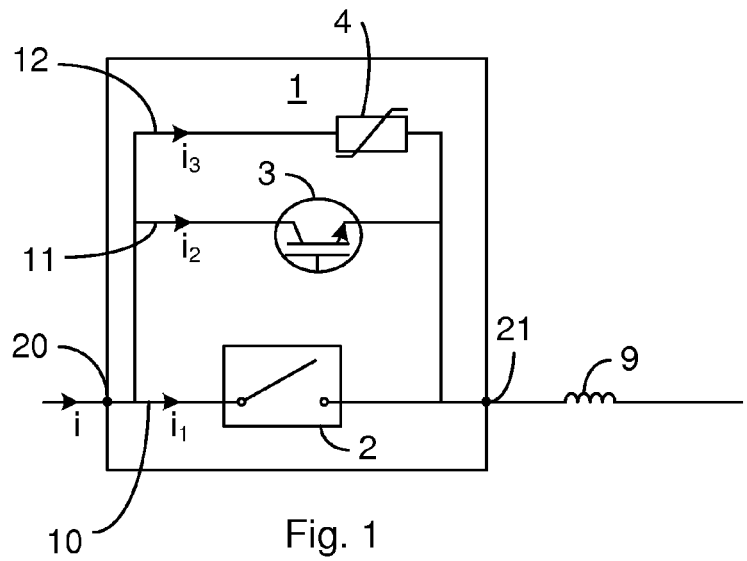
FIG. 1 is a schematic diagram illustrating the structure of an apparatus for breaking an electrical current.
Figure 2A:
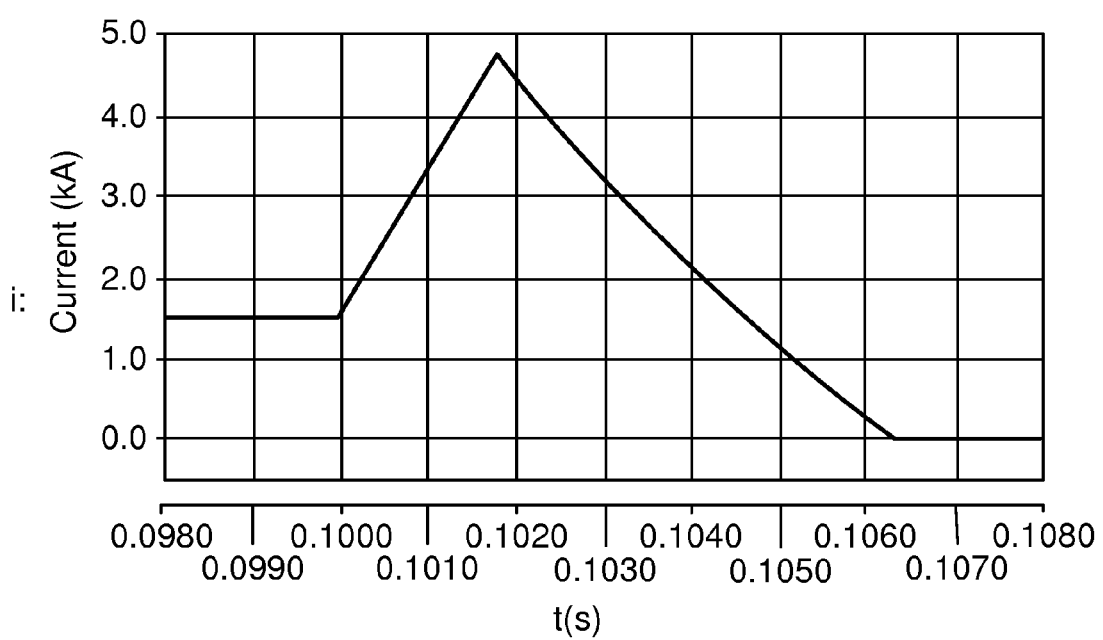
FIGS. 2A-D are schematic graphs illustrating various currents in the apparatus of FIG. 1.
Figure 2B:
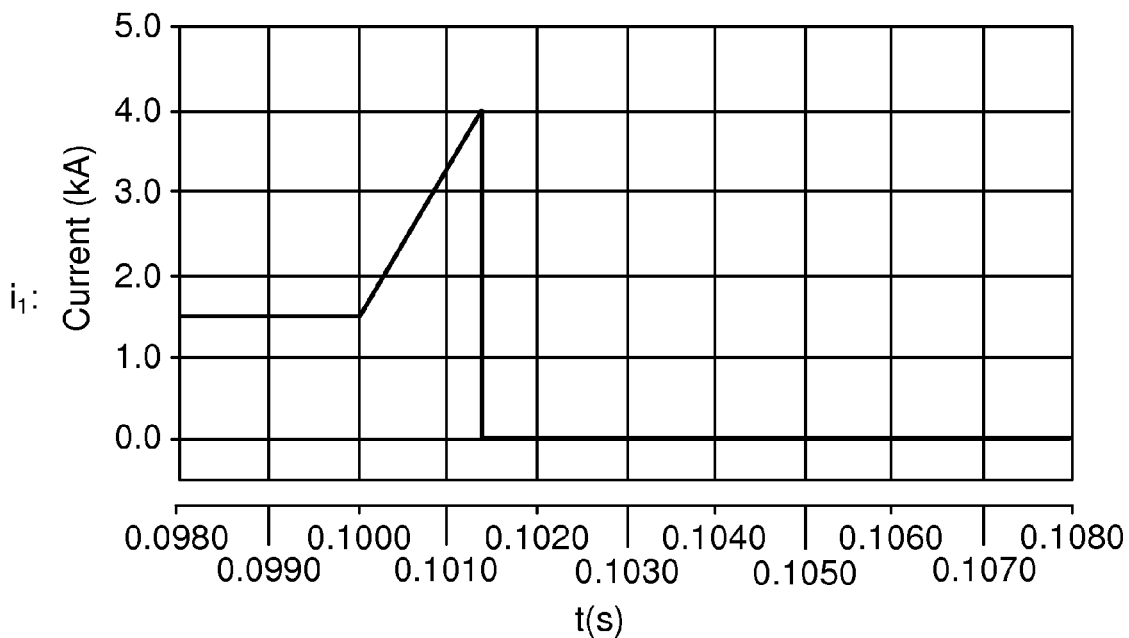
Figure 2C:
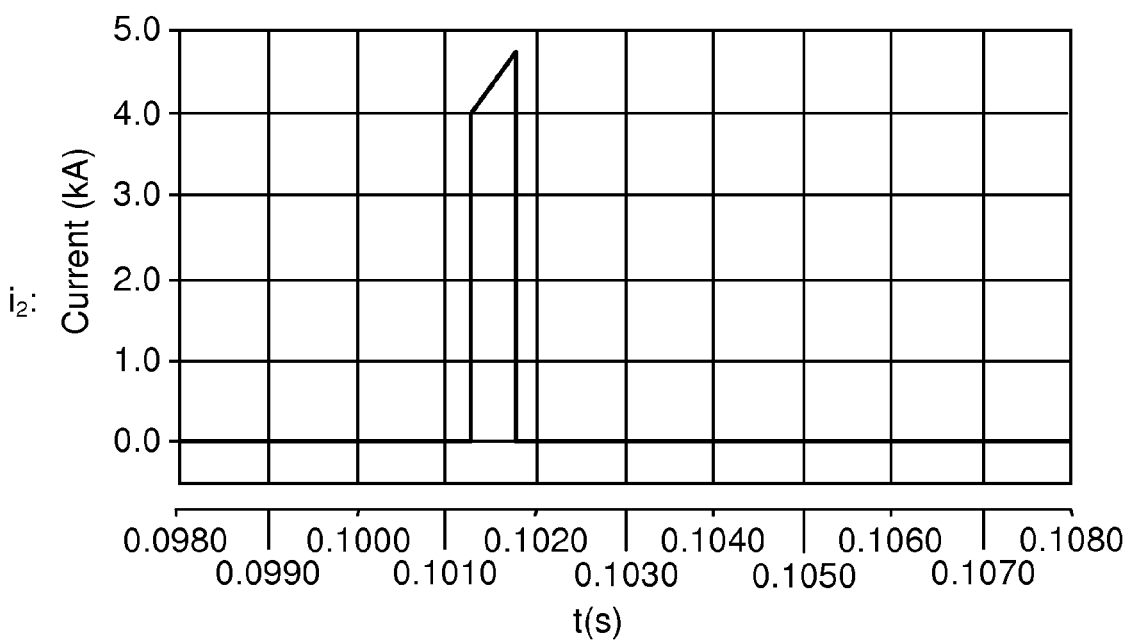
Figure 2D:
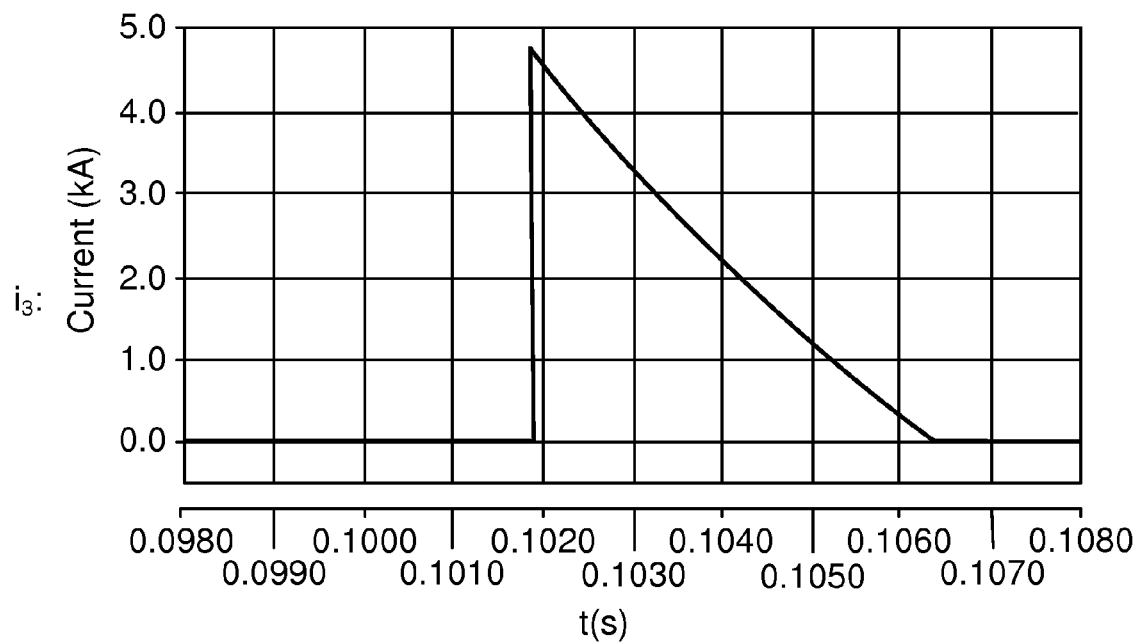
Figure 9:
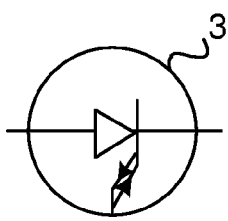
FIG. 9 is a schematic diagram illustrating one embodiment of a semiconductor switch of FIGS. 3, 5-6.

FIG. 1 is a schematic diagram illustrating the structure of an apparatus 1 for breaking an electrical current between a first point 20 and a second point 21. A mechanical switch leg 10 comprises a mechanical switch 2. A semiconductor switch leg 11 comprising a semiconductor switch 3 and a third leg 12 comprises an overvoltage protection circuit 4. The semiconductor switch 3 can be any suitable controllable semiconductor switch 3, such as a transistor or a thyristor. For example, the semiconductor switch 3 can be an insulated gate bipolar transistor (IGBT), a metal oxide semiconductor field effect transistor (MOSFET), a field effect transistor (FET) or a gate turn-off thyristor (as illustrated in FIG. 9).

The overvoltage protection circuit can e.g. be a snubber, such as a varistor, a capacitor, an RC (Resistor Capacitor) snubber, an RCD (Resistor Capacitor Diode) snubber, a capacitor or any combination of the mentioned snubber types, e.g. varistor and RC.

The three legs 10-12 are connected in parallel. An inductance 9 of a connected circuit is also shown.

A total current i into the apparatus 1 is divided into three currents: a first current component $i_1$ in the mechanical switch leg 10, a second current component $i_2$ in the semiconductor switch leg 11 and a third current component $i_3$ in the third leg 12.

FIGS. 2A-D are schematic graphs illustrating various currents i, $i_1$-$i_3$ in the hybrid breaker of FIG. 1 over time. These will now be explained with simultaneous reference to FIG. 1. It is to be noted that the graphs in FIGS. 2A-D are only non-limiting examples for explaining principles of operation.

At time 0.1000 s, a fault occurs, and the current continues to flow through the mechanical switch leg 10, as seen in the first and second current components $i_1$, $i_2$. Prior to 0.1013 s, when the fault is detected, the semiconductor switch 3 turns on (begins to conduct). At about 0.1013 s, the mechanical switch 2 opens (becomes blocking), whereby the current commutates to the semiconductor leg 11, whereby the second current component $i_2$ increases and the first current component i, through the mechanical switch leg to drops to zero. At about 0.1018 s, the semiconductor switch 3 turns off, whereby all current is commutated to the third leg 12 in the third current component $i_3$ to have the circuit's inductively stored energy absorbed by the overvoltage protection circuit 4. Over time, the overvoltage protection circuit 4 reduces the third current component $i_3$, e.g. through electric energy absorption, whereby the third current component $i_3$, and thus the total current i, drops down to zero at about 0.1064 s.

Figure 3:
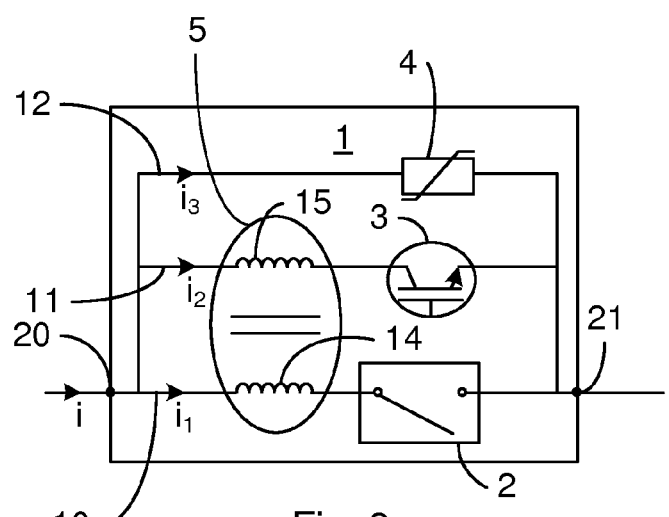
FIG. 3 is a schematic diagram illustrating an apparatus for breaking an electrical current according to one embodiment.

FIG. 3 is a schematic diagram illustrating an apparatus 1 for breaking an to electrical current according to one embodiment. In addition to the embodiment shown in FIG. 1, a mutual inductor 5 is provided here. The mutual inductor 5 comprises a first winding 14 and a second winding 15, which are mutually coupled. The core of the mutual inductor 5 can be an air core. Alternatively, the core of the mutual inductor is a core of magnetic material, such as iron, nickel or cobalt.

The first winding 14 is connected serially with the mechanical switch 2 in the mechanical switch leg to. The first winding 14 can be provided on either side of the mechanical switch 2. The second winding 15 is connected serially with the semiconductor switch 3 in the semiconductor switch leg 11. The second winding can be provided on either side of the semiconductor switch 3.

A self inductance of the second winding 15 is lower than a self inductance of the first winding 14.

The operation of the apparatus of FIG. 3 will now be explained with simultaneous reference to FIG. 4, which is a schematic graph illustrating various currents in the apparatus 1 of FIG. 3 when a fault occurs. The fault leads to an increased total current i over time. It is to be noted that the graph in FIG. 4 is only a non-limiting example for explaining principles of operation.

When the fault is detected, the semiconductor switch 3 turns on, leading to an increase in the second current component $i_2$. According to fundamental principles of an inductor, the voltage drop over an inductor is proportional to its inductance and to the derivative of the current over time (di/dt). Since the self inductance of the second winding 15 is lower than the self inductance of the first winding 14, the impedance of the second winding 15 is lower than the first winding 14.

Moreover, the mutual inductance of the mutual inductor 5 is flux stiff. Since both the first current component $i_1$ and the second current component $i_2$ contribute to the flux, the mutual inductor 5 resists change to the sum of the first current component $i_1$ and the second current component $i_2$.

Figure 4:
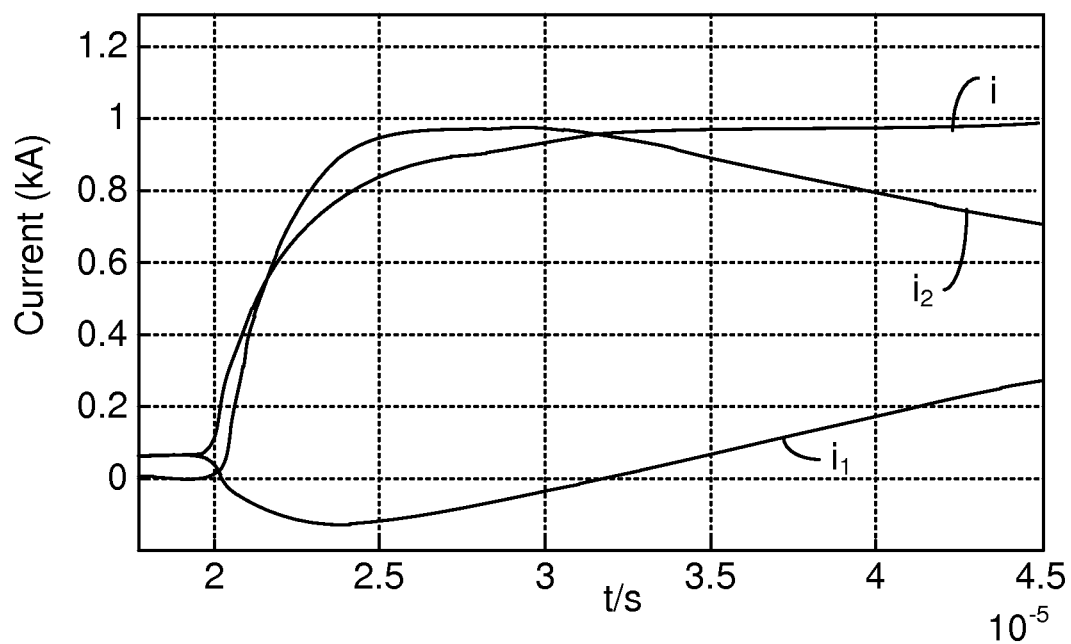
FIG. 4 is a schematic graph illustrating various currents in the apparatus of FIG. 3.

Once the semiconductor switch 3 is turned on, since the impedance at the to time of the fault is lower in the second winding 15 which is in semiconductor switch leg $i_1$, the second current component $i_2$ will increase and the first current component $i_1$ will decrease, as seen in FIG. 4. Notably, the first current component $i_1$ decreases below zero and increases over time to cross the zero again. It is best to open the mechanical switch 2 in time to ensure there is enough insulation to prevent electrical breakdowns (arcs) to appear or reappear in the contact gap after a current zero crossing.

Consequently, if the control is fast enough, the mechanical switch 2 could interrupt the current $i_1$ when the current $i_1$ first passes through zero (at the decreasing stage). Alternatively, the mechanical switch 2 can interrupt the current $i_1$ when the current passes through zero the second time (at the increasing stage). In this way, arcs are not required for the commutation. This reduces the requirements of arc voltage on the mechanical switch 2, compared to the prior art breakers. Also, it allows the electrical current to be broken in situations where it may not be possible with structures of the prior art. The commutation of currents away from the mechanical switch is achieved due to the inherent properties of the components in this structure, and requires no specific control.

A more serious fault can result in a greater di/dt. With the structure presented here, due to the difference in the self inductances of the two windings 14, 15, the effect of commutating current from the mechanical switch leg 10 to the semiconductor switch leg 11 is even greater in such a case. In other words, the fault is utilised to reduce the current in the mechanical switch leg 10 to allow the mechanical switch 2 to open, i.e. the faster the current rises, the easier it becomes to commutate the current from the mechanical switch to the semiconductor switch. In some solutions of the prior art, large reactors have been provided to reduce the rate at which the current is increased. However, with the presented solution, such costly reactors are not needed.

Figure 5:
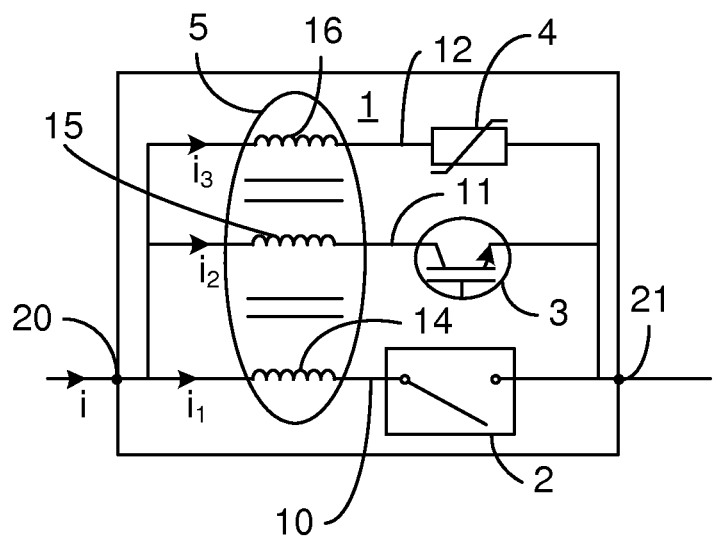
FIG. 5 is a schematic diagram illustrating an apparatus for breaking an electrical current according to another embodiment.

FIG. 5 is a schematic diagram illustrating an apparatus 1 for breaking an electrical current according to another embodiment. The apparatus 1 is similar to the apparatus of FIG. 3, but in this embodiment, the mutual inductor 5 comprises a third winding 16, provided in the third leg 12. The third winding 16 is provided in series with the overvoltage protection circuit 4. The third winding 16 facilitates the current commutation from the semiconductor switch leg 11 to the third leg 12 in a similar way to the mutual inductance between the mechanical switch leg 10 and the semiconductor switch leg 11.

Figure 6:
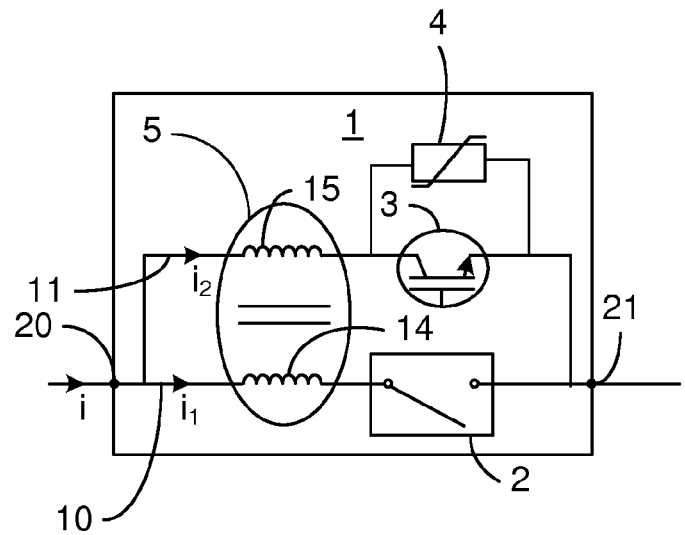
FIG. 6 is a schematic diagram illustrating an apparatus for breaking an electrical current according to another embodiment.

FIG. 6 is a schematic diagram illustrating an apparatus 1 for breaking an electrical current according to another embodiment. The apparatus 1 is similar to the apparatus of FIG. 3, but here the overvoltage protection circuit 4 is connected in parallel with the semiconductor switch 3. In this embodiment, the last stage of current commutation from the semiconductor switch 3 to the snubber 4 is facilitated by the fact that the current through the second winding 15 does not need to be changed.

Figure 7:
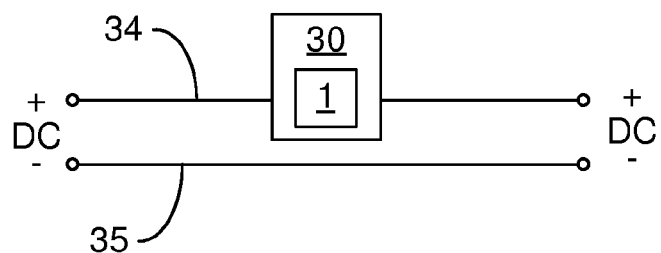
FIG. 7 is a schematic diagram illustrating a DC circuit breaker comprising the apparatus of FIGS. 3, 5-6.

FIG. 7 is a schematic diagram illustrating a DC circuit breaker 30 comprising the apparatus 1 of FIG. 3 or 5-6. The DC circuit breaker can e.g. break a High Voltage DC (HVDC) connection or a high current low or medium voltage DC connection, either on command or due to a fault.

Figure 8:
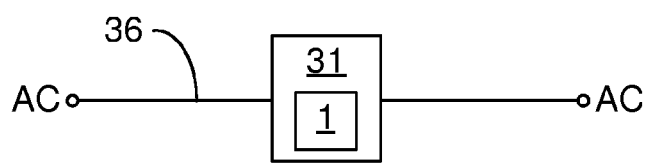
FIG. 8 is a schematic diagram illustrating an AC current limiter comprising the apparatus of FIGS. 3, 5-6.

FIG. 8 is a schematic diagram illustrating an AC current limiter 31 comprising the apparatus 1 of FIG. 3 or 5-6. The AC current limiter 31 breaks the electrical current when a current larger than a threshold current passes through the AC current limiter 31.

FIG. 9 is a schematic diagram illustrating one embodiment of a semiconductor switch 3. The semiconductor switch 3 in this embodiment is a thyristor, e.g. a gate turn-off (GTO) thyristor.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. An apparatus arranged to break an electrical current, the apparatus comprising:
   a mechanical switch leg comprising a first winding of a mutual inductor and a mechanical switch connected in series;
   a semiconductor switch leg comprising a second winding of the mutual inductor and a semiconductor switch connected in series; and
   an overvoltage protection circuit,
   wherein the mechanical switch leg and the semiconductor switch leg are connected in parallel and a self inductance of the second winding is lower than a self inductance of the first winding.

2. The apparatus according to claim 1, further comprising a third leg comprising the overvoltage protection circuit and wherein the third leg is connected in parallel to the mechanical switch leg and the semiconductor switch leg.

3. The apparatus according to claim 2, wherein the third leg further comprises a third winding of the mutual inductor, the third winding being connected in series with the overvoltage protection circuit.

4. The apparatus according to claim 1, wherein the overvoltage protection circuit is connected in parallel with the semiconductor switch.

5. The apparatus according to claim 1, wherein the overvoltage protection circuit is a snubber.

6. The apparatus according to claim 5, wherein the snubber is a varistor, an RC snubber, an RCD snubber or a capacitor.

7. The apparatus according to any one of the preceding claim 1, wherein the semiconductor switch is a transistor.

8. The apparatus according to claim 1, wherein the semiconductor switch is a thyristor.

9. The apparatus according to claim 8, wherein the thyristor is a gate turn-off thyristor.

10. The apparatus according to claim 7, wherein the transistor is a transistor selected from the group consisting of an insulated gate bipolar transistor, a metal oxide semiconductor field effect transistor, and a field effect transistor.

11. The apparatus according to claim 1, wherein the mutual inductor comprises an air core or a core of magnetic material.

12. A direct current, DC, circuit breaker comprising the apparatus according to claim 1.

13. An alternating current, AC, current limiter comprising the apparatus according to claim 1.

14. The apparatus according to claim 2, wherein the overvoltage protection circuit is a snubber.

15. The apparatus according to claim 3, wherein the overvoltage protection circuit is a snubber.

16. The apparatus according to claim 4, wherein the overvoltage protection circuit is a snubber.

17. The apparatus according to claim 2, wherein the semiconductor switch is a transistor.

18. The apparatus according to claim 3, wherein the semiconductor switch is a transistor.

19. The apparatus according to claim 4, wherein the semiconductor switch is a transistor.

20. The apparatus according to claim 5, wherein the semiconductor switch is a transistor.

* * * * *